US009531976B2

United States Patent
Korobov et al.

(10) Patent No.: US 9,531,976 B2
(45) Date of Patent: Dec. 27, 2016

(54) SYSTEMS AND METHODS FOR OPERATING IMAGE SENSOR PIXELS HAVING DIFFERENT SENSITIVITIES AND SHARED CHARGE STORAGE REGIONS

(71) Applicant: Semiconductor Components Industries, LLC, Phoenix, AZ (US)

(72) Inventors: Vladimir Korobov, San Mateo, CA (US); John Ladd, Santa Clara, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 86 days.

(21) Appl. No.: 14/290,814

(22) Filed: May 29, 2014

(65) Prior Publication Data
US 2015/0350582 A1 Dec. 3, 2015

(51) Int. Cl.
*H04N 5/378* (2011.01)
*H04N 5/3745* (2011.01)
*H04N 9/04* (2006.01)

(52) U.S. Cl.
CPC .......... *H04N 5/378* (2013.01); *H04N 5/37452* (2013.01); *H04N 9/045* (2013.01)

(58) Field of Classification Search
CPC H04N 5/23232; H04N 5/2355; H04N 5/3355; H04N 5/355; G06T 5/007
USPC ........................................ 348/308, 250, 257
See application file for complete search history.

(56) References Cited

U.S. PATENT DOCUMENTS

| 7,020,353 | B1 | 3/2006 | McCaffrey et al. |
| 7,829,832 | B2 | 11/2010 | Mauritzson et al. |
| 8,130,304 | B2 | 3/2012 | Yin et al. |
| 8,773,562 | B1* | 7/2014 | Fan ................... H01L 27/14643 250/208.1 |
| 2008/0259178 | A1* | 10/2008 | Oike ...................... H04N 5/347 348/222.1 |
| 2009/0002528 | A1* | 1/2009 | Manabe ............... H04N 5/2355 348/248 |
| 2009/0108176 | A1 | 4/2009 | Blanquart |
| 2009/0251575 | A1* | 10/2009 | Wada ................... H04N 5/3458 348/294 |
| 2010/0097508 | A1* | 4/2010 | Yanagita ........... H01L 27/14603 348/301 |

(Continued)

*Primary Examiner* — Lin Ye
*Assistant Examiner* — Chan Nguyen
(74) *Attorney, Agent, or Firm* — Treyz Law Group, P.C.; Michael H. Lyons (57) ABSTRACT

An image sensor may have control circuitry and an array of pixels having corresponding photodiodes. The pixels may be arranged into groups. Photodiodes in each of the groups may share a common charge storage region. Each photodiode has an associated sensitivity provided by a corresponding color filter element. The control circuitry may perform multiple charge transfer operations to transfer charge accumulated in high sensitivity photodiodes in the group to the shared charge storage region, may readout image signals corresponding to the transferred charge, and may combine the image signals to generate final image signals for the photodiodes. The control circuitry may transfer charge accumulated in low sensitivity photodiodes in the group to the shared charge storage region after the image signals generated by the high sensitivity photodiodes have been read out, thereby increasing the maximum signal to noise ratio of the low sensitivity photodiodes without causing charge blooming.

20 Claims, 6 Drawing Sheets

(56) References Cited

U.S. PATENT DOCUMENTS

| | | | |
|---|---|---|---|
| 2010/0188541 A1* | 7/2010 | Mabuchi | H01L 27/14656 348/302 |
| 2011/0310278 A1* | 12/2011 | Bai | H04N 5/35554 348/294 |
| 2012/0002089 A1 | 1/2012 | Wang et al. | |
| 2013/0100314 A1* | 4/2013 | Li | H04N 5/2353 348/229.1 |
| 2013/0242148 A1 | 9/2013 | Mlinar et al. | |
| 2014/0211052 A1* | 7/2014 | Choi | H01L 27/14609 348/297 |
| 2015/0350584 A1* | 12/2015 | Fenigstein | H04N 5/355 250/208.1 |

\* cited by examiner

SYSTEMS AND METHODS FOR OPERATING IMAGE SENSOR PIXELS HAVING DIFFERENT SENSITIVITIES AND SHARED CHARGE STORAGE REGIONS

BACKGROUND

This relates generally to imaging devices, and more particularly, to imaging devices having image sensor pixels with different sensitivities.

Image sensors are commonly used in electronic devices such as cellular telephones, cameras, and computers to capture images. In a typical arrangement, an electronic device is provided with an array of image pixels arranged in pixel rows and pixel columns. The image pixels include photodiodes that generate charge in response to image light during an exposure time. The image pixels convert the generated charge into analog image signals that are read out by pixel readout circuitry. The photodiodes have a charge storage capacity indicative of the amount of charge that can be stored on the photodiodes. Image pixels are often provided with color filter elements for generating image signals in response to different colors of light. Pixels with certain color filter elements may be more sensitive to light than pixels with other color filter elements (i.e., more sensitive pixels may generate charge on the corresponding photodiode faster than less sensitive pixels).

Conventional image sensors typically require use of the same integration time for all colors in order to avoid motion artifacts in the final captured image. Due to different sensitivities of image pixels of different colors, under a given color temperature illumination, the full charge storage capacity may not be utilized for several of the less sensitive color channels in the image sensor (i.e., because the charge capacity of the more sensitive image pixels is filled before the charge capacity of the less sensitive image pixels). For example, in image sensors having red, green, and blue pixels, red and blue pixels may not utilize the full charge capacity of the corresponding photodiodes as more photons are available in the green spectral range of the green image pixels. As the maximum signal-to-noise ratio of the generated image signals generally increases as the square root of the number of captured photons, less sensitive image pixels often have a reduced maximum signal-to-noise ratio when the array is formed with more sensitive image pixels than when all of the pixels have similar sensitivities.

It would therefore be desirable to be able to provide imaging devices with improved means for capturing and processing images.

DETAILED DESCRIPTION

Embodiments of the present invention relate to image sensors, and more particularly, to illuminated image sensors with image sensor pixels having different pixel sensitivities. If desired, the image sensor pixels may have shared charge storage regions. It will be recognized by one skilled in the art, that the present exemplary embodiments may be practiced without some or all of these specific details. In other instances, well-known operations have not been described in detail in order not to unnecessarily obscure the present embodiments.

Electronic devices such as digital cameras, computers, cellular telephones, and other electronic devices may include image sensors that gather incoming light to capture an image. The image sensors may include arrays of image pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements.

Figure 1:
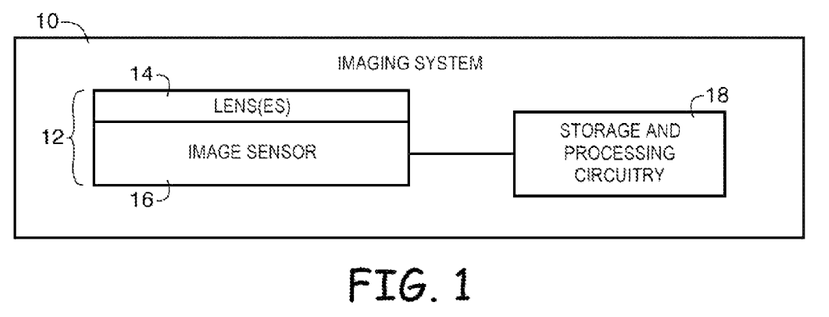
FIG. 1 is a diagram of an illustrative electronic device having an image sensor and processing circuitry for extending the effective exposure range (e.g., charge capacity) of image pixels in accordance with an embodiment of the present invention.

FIG. 1 is a diagram of an illustrative imaging system such as an electronic device that uses an image sensor to capture images. Electronic device 10 of FIG. 1 may be a portable electronic device such as a camera, a cellular telephone, a tablet computer, a webcam, a video camera, a video surveillance system, a video gaming system with imaging capabilities, or any other desired imaging system or device that captures digital image data. Camera module 12 may be used to convert incoming light into digital image data. Camera module 12 may include one or more lenses 14 and one or more corresponding image sensors 16. During image capture operations, light from a scene may be focused onto image sensor 16 by lens 14. Image sensor 16 may include circuitry for converting analog pixel data into corresponding digital image data to be provided to storage and processing circuitry 18. If desired, camera module 12 may be provided with an array of lenses 14 and an array of corresponding image sensors 16.

Processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18 (e.g., using an image processing engine on processing circuitry 18, using an imaging mode selection engine on processing circuitry 18, etc.). Processed image data may, if desired, be provided to external equipment (e.g., a computer, external display, or other device) using wired and/or wireless communications paths coupled to processing circuitry 18.

Figure 2:
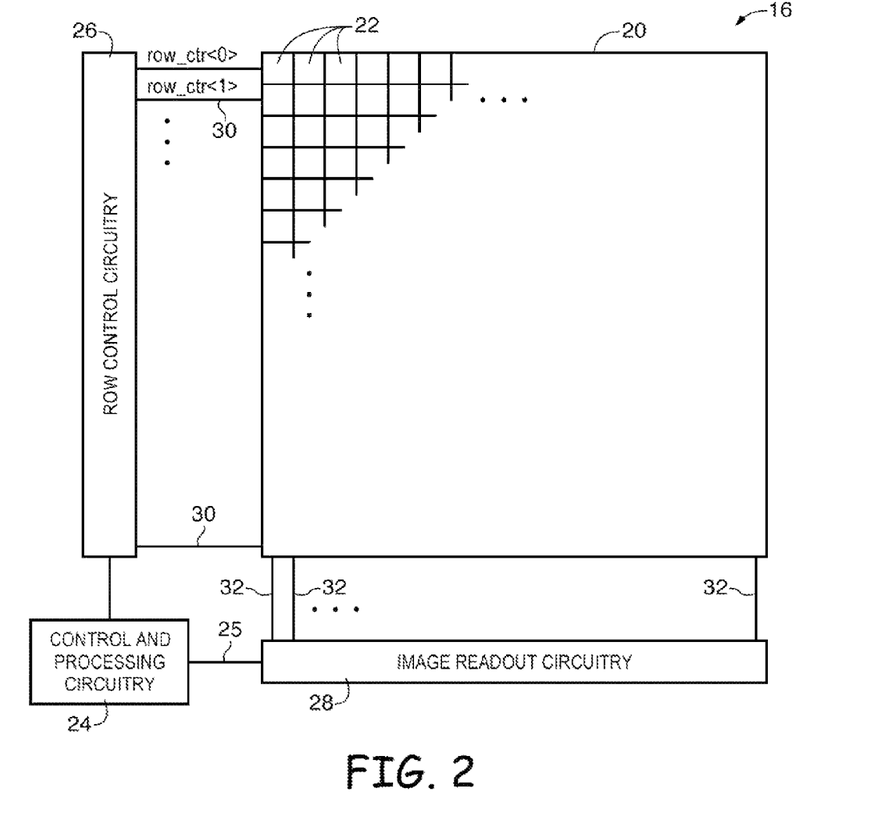
FIG. 2 is a diagram of an illustrative pixel array and associated readout circuitry for reading out image signals from image pixels in an image sensor in accordance with an embodiment of the present invention.

As shown in FIG. 2, image sensor 16 may include a pixel array 20 containing image sensor pixels 22 (sometimes referred to herein as image pixels or pixels) and control and processing circuitry 24. Array 20 may contain, for example, hundreds or thousands of rows and columns of image sensor pixels 22. Control circuitry 24 may be coupled to row control circuitry 26 and image readout circuitry 28 (sometimes referred to as column control circuitry, readout circuitry, processing circuitry, or column decoder circuitry) and may provide control signals to row control circuitry 26 and image readout circuitry 28 to control image capture operations and image signal readout operations using pixels 22. Row control circuitry 26 may receive row addresses from control circuitry 24 and supply corresponding row control signals row_ctr such as reset, row-select, charge transfer, and read control signals to pixels 22 over row control paths 30 (e.g., row control circuitry 26 may supply first row control signals row_ctr<0> to a first row of pixels 22 in array 20 over a first row control path 30, may supply second row control signals row_ctr<1> to a second row of pixels 22 in array 20 over a second row control path 30, etc.). One or more conductive lines such as column lines 32 may be coupled to each column of pixels 22 in array 20. Column lines 32 may be used for reading out image signals from pixels 22 and for supplying bias signals (e.g., bias currents or bias voltages) to pixels 22. If desired, during pixel readout operations, a pixel row in array 20 may be selected using row control circuitry 26 and image signals generated by image pixels 22 in that pixel row can be read out along column lines 32.

Image readout circuitry 28 may receive image signals (e.g., analog pixel values generated by pixels 22) over column lines 32. Image readout circuitry 28 may include sample-and-hold circuitry for sampling and temporarily storing image signals read out from array 20, amplifier circuitry, analog-to-digital conversion (ADC) circuitry, bias circuitry, column memory, latch circuitry for selectively enabling or disabling the column circuitry, or other circuitry that is coupled to one or more columns of pixels in array 20 for operating pixels 22 and for reading out image signals from pixels 22. Image readout circuitry 28 may supply image data (e.g., digital image data) to control and processing circuitry 24 and/or processor 18 (FIG. 1) over path 25 for pixels in one or more pixel columns.

Figure 3:
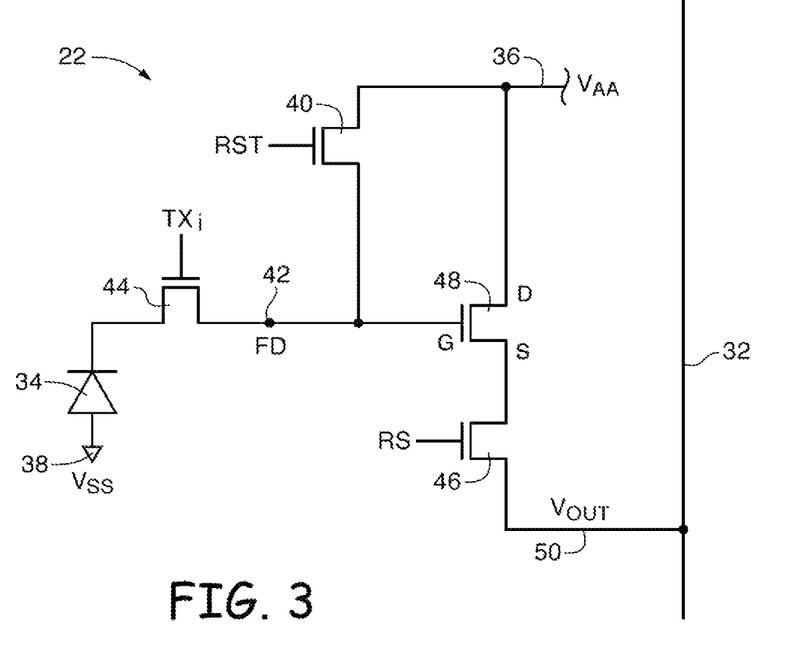
FIG. 3 is a circuit diagram of an illustrative image sensor pixel that may have a shared floating diffusion region in accordance with an embodiment of the present invention.

FIG. 3 is a circuit diagram of an illustrative image sensor pixel 22. As shown in FIG. 3, image pixel 22 may include a photosensitive element such as photodiode 34. A positive power supply voltage (e.g., voltage Vaa or another reset-level voltage) may be supplied at positive power supply terminal 36. A ground power supply voltage (e.g., Vss) may be supplied at ground terminal 38. Incoming light may be collected by a photosensitive element such as photodiode 34 after passing through a color filter structure such as a color filter element in a color filter array structure. Photodiode 34 converts the incoming light to electrical charge. Photodiode 34 may have a charge capacity (sometimes referred to herein as a charge well capacity) indicative of the amount of charge that can be stored on photodiode 34.

If desired, reset control signal RST may be asserted before an image is acquired. This turns on reset transistor 40 and resets charge storage node 42 (also referred to as floating diffusion FD) to Vaa or another reset-level voltage. The reset control signal RST may then be deasserted to turn off reset transistor 40. After the reset process is complete, transfer gate control signal $TX_i$, may be asserted to turn on transfer transistor (transfer gate) 44. When transfer transistor 44 is turned on, the charge that has been generated by photodiode 22 in response to incoming light is transferred to charge storage node 42. If desired, transfer gate control signal $TX_i$, may be supplied to transistor 44 at any desired voltage level (e.g., a maximum level corresponding to an "on" state in which all of the charge stored on photodiode 34 is transferred to floating diffusion 42, a minimum level corresponding to an "off" state in which no charge stored on photodiode 34 is transferred to floating diffusion 42, or an intermediate level that is less than the maximum level and greater than the minimum level in which some of the charge stored on photodiode 34 is transferred to floating diffusion 42). Charge storage node 42 may be implemented using a region of doped semiconductor (e.g., a doped silicon region formed in a silicon substrate by ion implantation, impurity diffusion, or other doping techniques). The doped semiconductor region (i.e., the floating diffusion FD) exhibits a capacitance that can be used to store the charge that has been transferred from photodiode 34 (e.g., region 42 may have a corresponding charge capacity indicative of the amount of charge that can be stored at region 42). The signal associated with the stored charge on node 42 is conveyed to row select transistor 46 by source-follower transistor 48.

When it is desired to read out the value of the stored charge (i.e., the value of the stored charge that is represented by the signal at the source S of transistor 48), row select control signal RS may be asserted. When signal RS is asserted, transistor 46 turns on and a corresponding image signal Vout that is representative of the magnitude of the charge on charge storage node 42 (e.g., a reset-level or an image-level voltage from photodiode 34) is produced on output path 50. In a typical configuration, there are numerous rows and columns of image pixels such as image pixel 22 in image pixel array 20. When row select control signal RS is asserted in a given row, a path such as column line 32 may be used to route signal Vout from that image pixel to readout circuitry such as image readout circuitry 28 of FIG. 2. If desired, reset-levels and image-levels may be sampled, held, and converted for each image pixel 22 to allow for noise compensation.

If desired, charge storage nodes 42 in array 20 may be shared between multiple pixels 22 in array 20. For example, charge storage node 42 of FIG. 3 may be shared between two or more pixels 22 (e.g., two or more pixels 22 having respective photo sensitive regions 34 and transfer gates 44 may share a single charge storage region 42). Image pixels 22 in array 20 that share a single charge storage region 42 may sometimes be referred to herein as an image pixel group or a shared charge storage region group of image pixels. Each photodiode 34 in a given image pixel group may be coupled to the shared charge storage region 42 via a respective charge transfer gate 44. Each photodiode 34 in a given image pixel group may be provided with a corresponding color filter element for generating charge in response to different colors of image light. Charge generated at each photodiode 34 in the image pixel group may be transferred to the associated shared storage region 42 when the transfer gate 44 corresponding to that photodiode 34 is turned on.

For example, a given image pixel group may include four image pixels 22 (e.g., four photodiodes 34 and corresponding transfer gates 44) that share a single charge storage region 42. The photodiode 34 in each pixel 22 in the given image pixel group may capture charge from image light. When it is desired to transfer captured charge from a first pixel in the image pixel group, the transfer gate corresponding to the first pixel may be turned on to transfer charge from the photodiode associated with the first pixel to shared charge storage region 42, when it is desired to transfer captured charge from a second pixel in the image pixel group, the transfer gate corresponding to the second pixel may be turned on to transfer charge from the photodiode associated with the second pixel to shared charge storage region 42, when it is desired to transfer captured charge from a third pixel in the image pixel group, the transfer gate corresponding to the third pixel may be turned on to transfer charge from the photodiode associated with the third pixel to shared charge storage region 42, and when it is desired to transfer captured charge from a fourth pixel in the image pixel group, the transfer gate corresponding to the fourth pixel may be turned on to transfer charge from the photodiode associated with the fourth pixel to shared charge storage region 42.

Pixel array 20 may include any desired number of image pixel groups with shared charge storage regions. Each image pixel group may include any desired number of pixels arranged in any desired shape or size on array 20. For example, each image pixel group may include four adjacent image pixels 22 from a single column of array 20, may include four adjacent image pixels 22 from two adjacent columns of array 20, may include two image pixels 22 located in adjacent rows and adjacent columns of array 20, or may include any other desired number and arrangement of image pixels 22.

Image sensor pixels such as image pixels 22 may be provided with a color filter array (e.g., an array of color filter elements) which allows a single image sensor to sample different colors of light red, such as red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. However, limitations of signal to noise ratio (SNR) that are associated with the Bayer Mosaic pattern make it difficult to reduce the size of image sensors such as image sensor 16. It may therefore be desirable to be able to provide image sensors with an improved means of capturing images.

Figure 4:
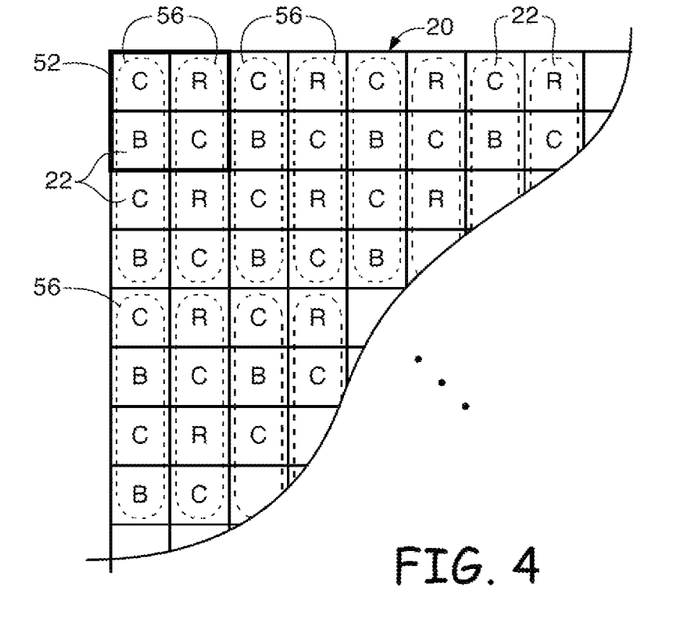
FIG. 4 is a diagram of a pixel array of the type shown in FIG. 2 having groups of pixels that share a single charge storage region with adjacent pixels in the associated column of the array and that have photosensitive regions with different sensitivities in accordance with an embodiment of the present invention.

In one suitable arrangement that is sometimes discussed herein as an example, the green pixels in a Bayer pattern are replaced by broadband image pixels as shown in FIG. 4. As shown in FIG. 4, a unit cell 52 of image pixels 22 may be formed from two broadband clear (C) image pixels (sometimes referred to as white image pixels or clear filter image pixels) that are diagonally opposite one another and adjacent to a red (R) image pixel that is diagonally opposite to a blue (B) image pixel. Clear image pixels 22 in unit cell 52 may be formed with a visibly transparent color filter that transmits light across the visible light spectrum (e.g., clear pixels 22 can capture white light). Clear image pixels 22 may have a natural sensitivity defined by the material that forms the transparent color filter and/or the material that forms the image sensor pixel (e.g., silicon). In another suitable arrangement, clear image pixels 22 may be formed without any color filter elements. The sensitivity of clear image pixels 22 may, if desired, be adjusted for better color reproduction and/or noise characteristics through use of light absorbers such as pigments. Clear image pixels 22 may be sensitive to light across the entire visible light spectrum or may be sensitive to broad portions of the visible light spectrum.

Unit cell 52 may be repeated across image pixel array 20 to form a mosaic of red, clear, and blue image pixels 22. In this way, red image pixels may generate red image signals in response to red light, blue image pixels may generate blue image signals in response to blue light, and clear image pixels may generate clear image signals in response to white light (e.g., any desired broad-spectrum visible light). Clear image pixels 22 may have a substantial response to any suitable combination of light of at least two of the following colors: red, green, and blue. In this way, clear image pixels 22 may have a broadband response relative to the non-clear image pixels in each unit cell (e.g., clear pixels 22 may therefore sometimes be referred to as broadband image pixels 22). If desired, broadband pixels 22 may have clear color filter elements in which a pigment such as a yellow pigment has been added to clear color filter element material (e.g., so that the color filter of broadband pixels 22 pass red and green light and the clear image signals are not generated in response to any blue light). The example of FIG. 3 is merely illustrative. If desired, unit cell 34 may have any desired size, may be rectangular, and may include any desired colored pixels (e.g., yellow pixels, black pixels, cyan pixels, blue pixels, red pixels, green pixels, infrared pixels, magenta pixels, pixels sensitive to combinations of one or more of these colors, etc.). If desired, clear pixels 22 may be replaced with any pixels having a sensitivity that is greater than the sensitivity of the other pixels in array 20 (e.g., clear pixels C may be replaced with green pixels G if desired). The use of clear pixels C is described herein as one suitable example for array 20.

Clear image pixels 22 can help increase the signal-to-noise ratio (SNR) of image signals captured by image sensor 16 by gathering additional light in comparison with image pixels having a narrower color filter (e.g., a filter that transmits light over a subset of the visible light spectrum), such as green image pixels, red image pixels, or blue image pixels. Clear image pixels 22 may particularly improve SNR in low light conditions in which the SNR can sometimes limit the image quality of images. In general, color filter elements in clear pixels 22 in array 20 may allow more light to be captured by the associated photodiodes 34 than other color filter elements in array 20 (e.g., color filter elements such as red and blue color filter elements). In other words, clear pixels 22 in array 20 may be more sensitive to incoming light than blue or red pixels 22 in array 20.

As shown in FIG. 4, array 20 may include multiple image pixel groups 56 having a shared charge storage region 42. In the example of FIG. 4, each image pixel group 56 includes four pixels located within a single column of array 20 (e.g., each image pixel group 56 in the first column of array 20 may include two clear image pixels 22 and two blue image pixels 22 that share a single associated charge storage region 42, whereas each image pixel group 56 in the second column of array 20 may include two clear image pixels 22 and two red image pixels 22 that share a single associated charge storage region 42, etc.). Each group of image pixels 56 may share common readout circuitry in image readout circuitry 28 (e.g., common sample and hold circuitry, converter circuitry, etc.), may share a common reset transistor 40, and may share a common row select transistor 46. This example is merely illustrative. If desired, image pixel groups 56 may have any desired shape, may include any desired number of pixels, and array 20 may be formed with any desired color filter array.

Figure 5:
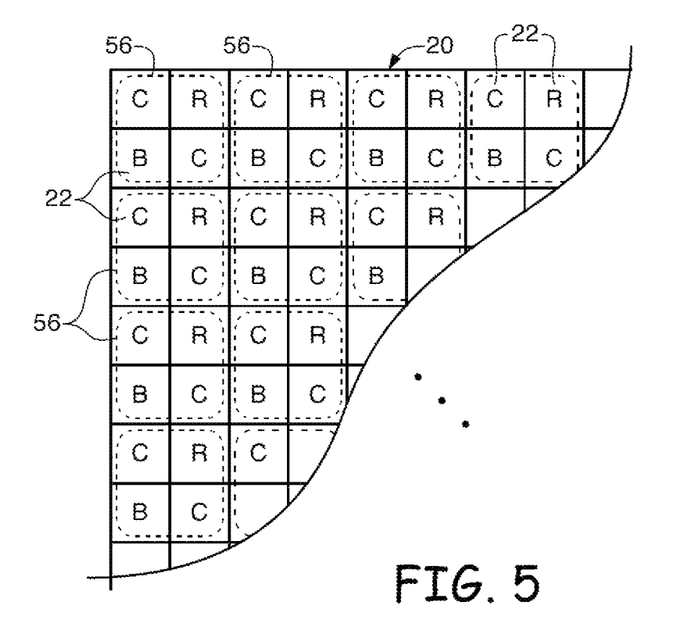
FIG. 5 is a diagram of a pixel array of the type shown in FIG. 2 having two-pixel by two-pixel groups of pixels that share a single charge storage region and that have photosensitive regions with different sensitivities in accordance with an embodiment of the present invention.

FIG. 5 is an illustrative diagram showing another example in which each image pixel group 56 includes four adjacent image pixels 22 arranged in a square pattern that share a single charge storage region 42 (e.g., so that two adjacent image pixels in a given row of array 20 share a single charge storage region 42 with two adjacent pixels in a subsequent row of array 20). As shown in FIG. 5, each image pixel group 56 includes two clear image pixels 22, a single red image pixel 22, and a single blue image pixel 22.

Image pixels 22 may generate charge from incoming light and can store the captured charge on photodiode 34 during associated integration (exposure) times. In many image sensors, the same integration time is typically used to capture charge for pixels of each color (e.g., red, green, and blue pixels in arranged in a Bayer mosaic pattern typically all capture charge and store the charge on the associated photodiodes using the same common integration time). However, in scenarios where the image sensor is provided with different colored pixels having different sensitivities, such as when clear pixels 22 are formed in array 20 (e.g., as shown in FIGS. 4 and 5), pixels of different colors may accumulate charge at different rates. For example, clear pixels 22 may accumulate charge for a given illuminant at a greater rate than red or blue pixels 22, because the clear color filter elements associated with clear pixels 22 may pass more light to the associated photodiodes than red or blue color filter elements. Because clear pixels 22 accumulate charge on the corresponding photodiodes 34 at a greater rate than other pixels 22, the pixel charge capacity (e.g., the amount of charge that may be stored on the associated photodiode 34) may not be fully utilized for all of the pixels in the array.

As an example, clear pixels 22 may accumulate charge three times faster than red and blue pixels 22 (e.g., clear pixels 22 may be three times more sensitive than red or blue pixels 22). In this scenario, clear pixels 22 accumulate enough charge to fill the charge capacity associated with clear pixels 22, whereas only one-third of the charge capacity associated the red and blue pixels 22 will be filled with accumulated charge. As the raw maximum SNR of captured image signals typically increases as the square root of the number of photons captured, the effective maximum SNR image signals captured by the red and blue pixels will be reduced by the square root of three (e.g., approximately 42%). In general, capturing image signals using an array formed with clear pixels 22 in addition to less sensitive pixels such as red and blue pixels 22 may limit the maximum SNR of image signals captured by the less sensitive image pixels.

If desired, image sensor 16 may extend the effective amount of time during which clear image pixels 22 integrate charge in order to allow red and blue image pixels 22 to continue to integrate charge so that the charge capacity associated with the red and blue image pixels is filled. However, if care is not taken, continuing to integrate charge after the charge capacity of clear image pixels 22 has been filled may cause excess charge to leak from clear pixels 22 onto adjacent pixels 22 in array 20 in a process sometimes referred to as cross-channel blooming. It may therefore be desirable to be able to provide improved means for capturing and reading out image signals using clear pixels 22.

Figure 6:
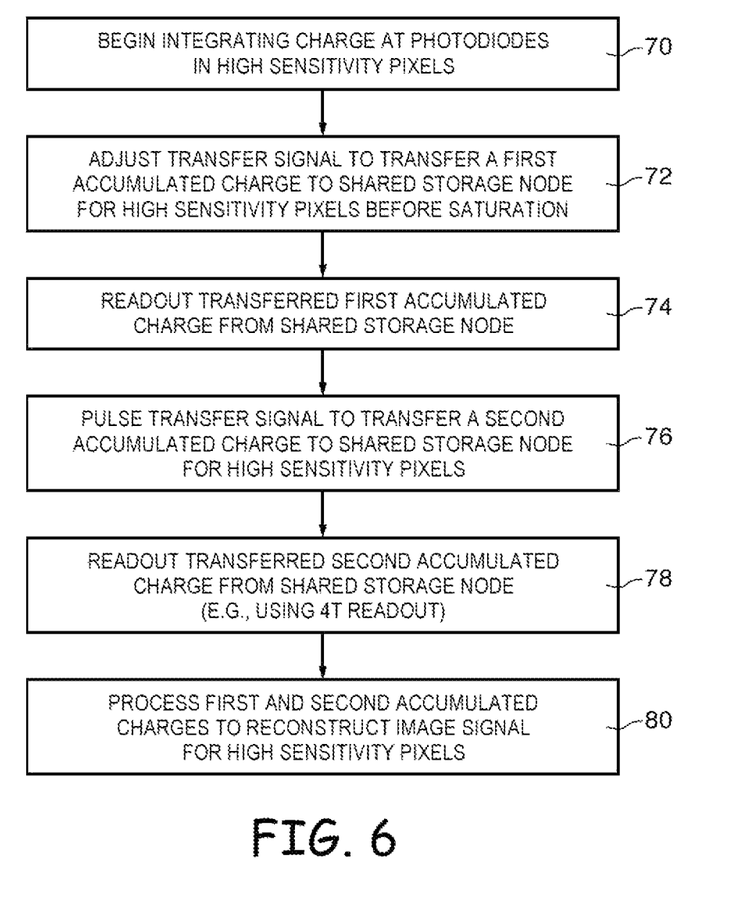
FIG. 6 is a flow chart of illustrative steps that may be performed by clear pixels in an array of the type shown in FIGS. 4 and 5 for extending the effective range (e.g., charge capacity) of the clear pixels in accordance with an embodiment of the present invention.

FIG. 6 is a flow chart of illustrative steps that may be performed by image sensor 16 to generate image signals using clear pixels 22 over an extended period of time so that blue and red pixels 22 in array 20 may utilize substantially all of their associated charge capacities (e.g., so that the maximum SNR in the red and blue channels is improved). In other words, the effective charge capacity or the so-called effective exposure range of clear pixels 22 may be extended (e.g., using the steps of FIG. 6).

At step 70, array 20 may begin integrating charge at photosensitive regions 34 of clear pixels 22 in response to image light.

At step 72, row control circuitry 26 (FIG. 2) may perform a first charge transfer operation by adjusting the transfer signal TX, provided to clear pixels 22, so that a first accumulated charge is transferred to the floating diffusion regions 42 corresponding to each of the clear pixels 22. For example, row control circuitry 26 may pulse transfer signal $TX_i$, with a maximum voltage level to transfer all of the accumulated charge from photodiodes 34 to floating diffusion regions 42. In another suitable arrangement, control circuitry 26 may assert transfer signal $TX_i$, with an intermediate voltage level that is less than the maximum voltage to continually transfer accumulated charge to floating diffusion regions 42. After performing the first charge transfer operation, photosensitive regions 34 in clear pixels 22 may continue to accumulate charge in response to incoming light. Array 20 may perform the first charge transfer operation at any desired time. For example, array 20 may perform the first charge transfer operation after a predetermined amount of time, after a predetermined amount of charge has been accumulated on clear pixels 22, once the charge capacity of photodiodes 34 has been filled, immediately before the charge capacity of photodiodes 34 are about to be filled, etc. In general, array 20 may perform the first charge transfer operation prior to saturation of photosensitive regions 34 (e.g., prior to filling the full charge well capacity of photosensitive regions 34).

At step 74, image readout circuitry 28 may read out the charge that was transferred to floating diffusion regions 42 during the first charge transfer operation (e.g., the charge transferred to floating diffusion regions 42 during the first charge transfer operation may be read out over column lines 32 and passed to readout circuitry 28).

At step 76, row control circuitry 26 may perform a second charge transfer operation by pulsing transfer signal TX, provided to clear pixels 22. In this way, a second accumulated charge that had been accumulated on photosensitive regions 34 after performing the first charge readout operation (e.g., after processing step 74) may be transferred to storage nodes 42. Array 20 may perform the second charge transfer operation at any desired time. For example, array 20 may perform the second charge transfer operation after a predetermined amount of time, after a predetermined amount of charge has been accumulated using the less-sensitive pixels in array 20 (e.g., red and/or blue pixels 22), after photosensitive regions 34 in clear pixels 22 have been filled again, after photosensitive regions 34 in red and/or blue pixels 22 have been filled, immediately before the charge capacity of the photodiodes 34 in red and/or blue pixels 22 are about to be filled, etc.

At step 78, pixel readout circuitry 28 may readout the second accumulated charge (e.g., the charge that was transferred to floating diffusion regions 42 during the second charge transfer operation). If desired, array 20 may readout a reset level from clear pixels 22 prior to transferring the second accumulated charge and may use the reset level to perform kTc-reset noise mitigation operations.

At step 80, image readout circuitry 28 and/or control and processing circuitry 24 may process the first and second accumulated charges to generate image signals for clear pixels 22. For example, control and processing circuitry 24 may reconstruct image signals for clear pixels 22 by intelligently summing the first and second accumulated charges. By performing both first and second charge transfer operations, clear pixels 22 may accumulate a greater amount of charge without saturating photodiode 34 or generating cross-channel blooming than pixels that perform only a single charge transfer operation. In this way, the effective integration time (exposure range) of clear pixels 22 may be extended so that the less-sensitive pixels 22 in array 20 (e.g., blue and red pixels 22) may continue to accumulate charge (e.g., to improve SNR in the red and blue channels) without saturation of photodiodes 34 in clear pixels 22 or generation of cross-channel blooming.

The example of FIG. 6 is merely illustrative. If desired, image sensor 16 may perform and desired number of charge transfer operations. For example, clear pixels 22 may transfer signal TX, may be pulsed three, four, five, or more than five times in order to transfer charge from photodiodes 34 to charge storage region 42 without saturating photodiodes 34.

Figure 7:
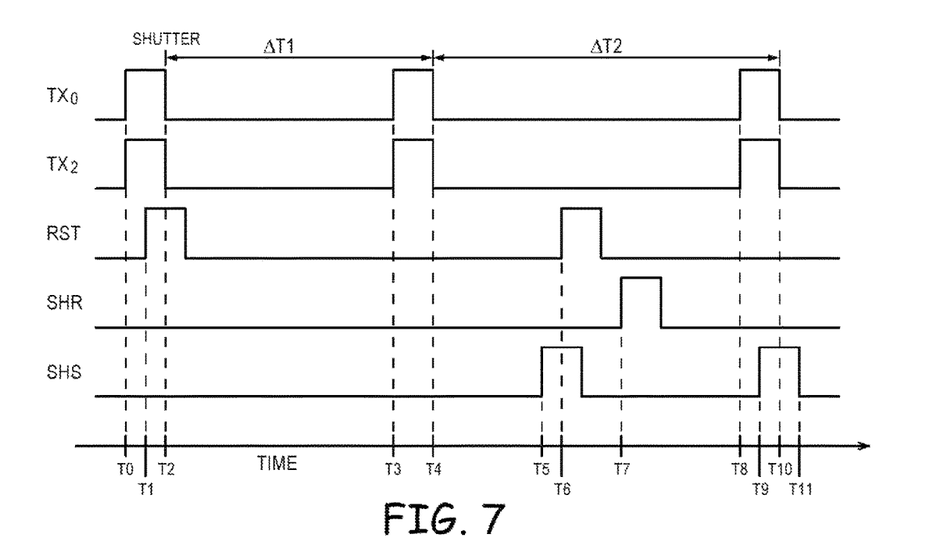
FIG. 7 is a timing diagram illustrating charge transfer and readout operations using two clear pixels of the type shown in FIGS. 4 and 5 having a shared charge storage region in accordance with an embodiment of the present invention.

FIG. 7 is a timing diagram that illustrates one example of the operation of clear pixels 22 in a given pixel group 56 for performing multiple charge transfer operations to prevent saturation of photodiodes 34, while allowing less sensitive pixels in array 20 to continue to accumulate charge. Row control circuitry 26 may supply control signals row_ctr through control paths 30 to control the operation of clear pixels 22 (FIG. 2). In the example of FIG. 7, signals row_ctr are supplied to clear pixels 22 in a particular pixel group 56 formed from adjacent pixels in a common column of array 20 (e.g., as shown in FIG. 4). Control signals row_ctr may include a first charge transfer signal $TX_0$ provided to a clear pixel 22 in a first row of array 20, a second charge transfer signal $TX_2$ provided to a clear pixel 22 in a third row of array 20, reset signal RST (e.g., for resetting the floating diffusion node 42 shared by both of the pixels in the group), a sample and hold reset level control signal SHR, and a sample and hold image level control signal SHS. Sample and hold signals SHR and SHS may be provided to sampling circuitry formed on image readout circuitry 28 (FIG. 2) to allow readout circuitry 28 to sample and hold charge stored on floating diffusion 42. Sample and hold signals SHR and SHS may, for example, be asserted simultaneously with row select signal RS provided to the corresponding row select transistor 46 coupled between the shared floating diffusion node 42 and column line 32 or may be asserted after asserting row select signal RS.

At time T0, charge transfer signal $TX_0$ provided to the first clear pixel in the group and charge transfer signal $TX_1$ provided to the second clear pixel in the group may be asserted. At time T1, pixel reset control signal RST may be asserted to turn on the reset transistor 40 coupled to the shared floating diffusion node 42 to reset any charge stored at node 42. At time T2, charge transfer signals $TX_0$ and $TX_1$ may be deasserted. Photodiodes 34 in the first and second clear pixels may begin to accumulate charge at time T2.

At time T3, transfer signals $TX_0$ and $TX_2$ may be reasserted to transfer a first amount of charge accumulated on photodiodes 34 to shared floating diffusion node 42 (e.g., in a first charge transfer operation). Transfer signals $TX_0$ and $TX_2$ may be deasserted at time $T_4$. Times T3 and T4 may be selected so that clear pixels 22 are provided with a predetermined exposure period $\Delta T1$. In another suitable arrangement, times T3 and T4 may be chosen so that photodiodes 34 do not completely fill with accumulated charge (saturate). After time T4, transfer signals $TX_0$ and $TX_2$ may be deasserted and photodiodes 34 in clear pixels 22 may continue to accumulate a second amount of charge.

In the example of FIG. 7, transfer signals $TX_0$ and $TX_2$ are asserted with a maximum voltage so that all of the charge accumulated during exposure period $\Delta T1$ is transferred to shared floating diffusion node 42. By transferring all of the charge accumulated on photodiodes 34, any uncertainty about the illumination level required to achieve floating diffusion storage may be eliminated. However, pulsing transfer signals $TX_0$ and $TX_2$ with the maximum voltage may limit the full well extension of photodiodes 34 to twice the normal capacity of photodiodes 34 and may increase readout noise for low light portions of bright scenes.

At time T5, sample and hold image level control signal SHS may be asserted to read out the first amount of charge that was transferred during the first charge transfer operation (e.g., the charge transferred between times T3 and T4) using image readout circuitry 28. The first amount of charge may sometimes be referred to herein as overflow charge. Pixel reset control signal RST may be reasserted at time T6 to reset shared floating diffusion node 42 to voltage Vaa. Sample and hold reset level control signal SHR may be asserted at time T7 to readout the reset level using image readout circuitry 28. The reset level may be used by readout circuitry 28 to mitigate kTc-reset noise in the final image signal. The charge that is read out and sampled using image readout circuitry 28 between times T5 and T6 may sometimes be referred to herein as a first charge sample or a so-called "3 T" sample (e.g., the 3 T sample may include the first amount of charge generated during first exposure period $\Delta T1$ that is transferred to floating diffusion 42 during the first charge transfer operation). The 3 T sample may include kTc-reset noise, as no corresponding reset level for the charge generated during first exposure period $\Delta T1$ is read out.

Transfer signals $TX_0$ and $TX_2$ may be reasserted at the maximum voltage at time T8 to transfer all of the charge accumulated on photodiodes 34 to shared floating diffusion node 42 (e.g., to transfer the second amount of charge to node 42 in a second charge transfer operation). Transfer signals $TX_0$ and $TX_2$ may be deasserted at time T10. Times T8 and T10 may be selected so that clear pixels 22 are provided with a second predetermined exposure period $\Delta T2$ after the first charge transfer operation. If desired, exposure period $\Delta T2$ may be equal to first exposure period $\Delta T1$ or may be different from first exposure period $\Delta T1$. Sample and hold image level control signal SHS may be reasserted at time T9 to read out the second amount of charge transferred to floating diffusion 42 during the second charge transfer operation using image readout circuitry 28. The second amount of charge that is readout and sampled using image readout circuitry 28 between times T7 and T11 may sometimes be referred to herein as a second charge sample or a so-called "4 T" sample (e.g., the 4 T sample may include the second amount of charge generated during second exposure period ΔT2 that is transferred to floating diffusion 42 during the second charge transfer operation and a corresponding reset level signal). If desired, the 4 T sample may be compensated for kTc-reset noise (e.g., because a corresponding reset level is also read out).

The example of FIG. 7 is merely illustrative. In another suitable arrangement, transfer signals $TX_0$ and $TX_2$ may be continuously asserted between times T2 and T8 with an intermediate voltage (e.g., a voltage that is less than the maximum voltage shown in FIG. 7) so that any excess charge that exceeds a predetermined level (e.g., any charge accumulated after saturation of photodiode 34) will be transferred to shared floating diffusion node 42. This scenario may allow greater charge well extension and reduced risk of charge blooming, but may generate dark current at a higher rate relative to the arrangement shown in FIG. 7. If desired, the second amount of charge accumulated during second exposure period ΔT2 may be transferred to floating diffusion 42 and readout for each clear pixel 22 at different times (e.g., so that image readout circuitry 28 may determine which clear pixel 22 generated the corresponding 4 T sample).

Performing multiple charge transfer operations may allow charge accumulated on photodiodes 34 of clear pixels 22 may be partially or fully transferred to floating diffusion node 42 at one or more times during the exposure (e.g., at a mid-point during the exposure). In this way, pixel array 20 may mitigate charge blooming to pixels adjacent to the clear pixels 22 in array 20 while improving SNR in the signals generated by the less sensitive pixels in array 20 (e.g., red and blue pixels 22).

Figure 8:
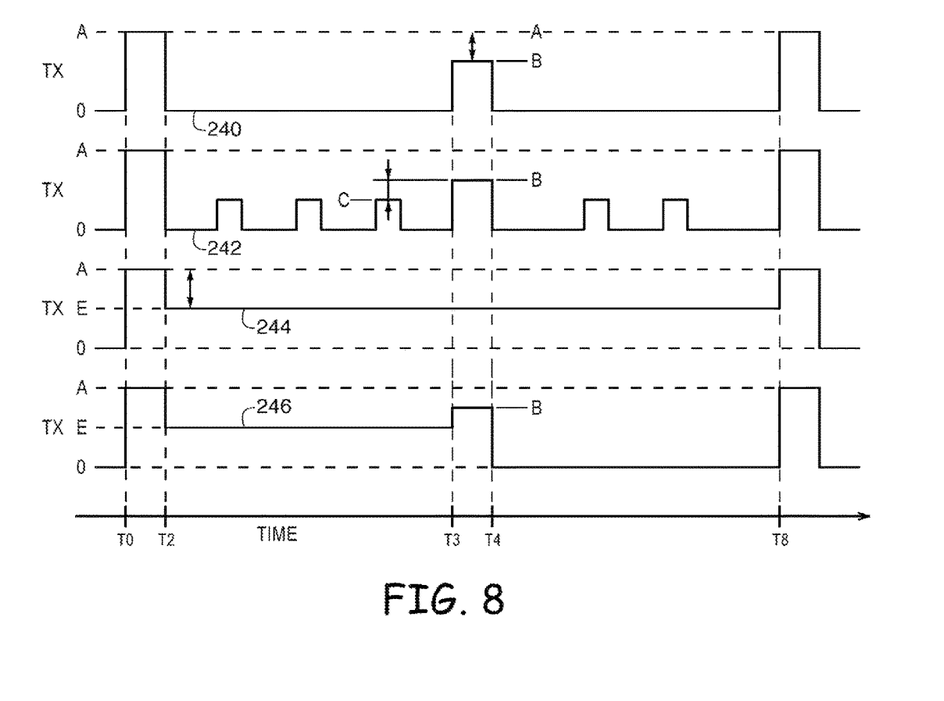
FIG. 8 is a timing diagram illustrating charge transfer signals may be applied to pixels having a shared charge storage region for extending the effective charge well capacity of the pixels in accordance with an embodiment of the present invention.

FIG. 8 is a timing diagram that illustrates additional examples of charge transfer signals that may be supplied to pixels 22 for performing multiple charge transfer operations. As shown in FIG. 8, curves 240-246 show how charge transfer signal TX (e.g., $TX_0$ or $TX_2$ as shown in FIG. 7) may vary over time to perform multiple charge transfer operations for pixels 22. Curve 240 illustrates an example of a charge transfer signal with two charge transfer operations performed by pulsing charge transfer signal TX at time T3 (similar to signals $TX_0$ and $TX_2$ as shown in FIG. 7). If desired, transfer signal TX may be pulsed high (e.g., at a voltage magnitude A) at times T0 and T8 and may be asserted at an intermediate voltage magnitude B at time T3. Magnitude B may be any desired value that is less than or equal to magnitude A (e.g., magnitude B may be 100% of magnitude A, 80% of magnitude A, 10% of magnitude A, etc.).

Curve 242 shows an example of how transfer signal TX may be asserted at magnitude B at time T3 and pulsed at magnitude C between times T0 and T3 and/or between times T3 and T8. Magnitude C may be any desired voltage magnitude that is less than or equal to magnitude B (e.g., magnitude C may be 100% of magnitude B, 80% of magnitude B, 10% of magnitude B, etc.). Transfer signal TX may be pulsed any desired number of times between times T0 and T3 and any desired number of times between times T3 and T8. If desired, signal TX may be pulsed more times between times T0 and T3 than between times T3 and T8, may be pulsed more times between times T3 and T8 than between times T0 and T3, may be pulsed the same number of times between times T0 and T3 as between times T3 and T8, etc.

Curve 244 shows an example of how transfer signal TX may be continuously asserted at an intermediate voltage E between times T2 and T8. Voltage magnitude E may be any desired magnitude that is greater than zero and less than magnitude A (e.g., magnitude E may be 50% of magnitude A, 10% of magnitude A, etc.). This scenario may allow greater charge well extension and reduced risk of charge blooming, but may generate dark current at a higher rate relative to the arrangements in which transfer signal 240 is used. Curve 246 shows an example of how charge transfer signal TX may be continuously asserted at intermediate voltage E between times T2 and T3 and then asserted at voltage B at time T3. In one suitable arrangement, transfer signal TX is continuously asserted at voltage E between times T2 and T3 and is asserted at voltage A at time T3. Transfer signal 246 may then be deasserted at time T4 and pulsed high at time T8. The examples of FIG. 8 are merely illustrative. If desired, any charge transfer signal TX having multiple charge transfer operations may be implemented by pixels 22 (e.g., any combination of the signals TX shown in FIG. 8). If desired, different charge transfer signals may be used for a given pixel 22 at different times.

In the example of FIG. 4, each pixel group 56 may include two clear pixels 22. In this scenario, after reading out the 3 T and 4 T samples from the corresponding floating diffusion node 42, image readout circuitry 28 may combine the 3 T and 4 T samples using any desired combination operation. If desired, the 3 T and 4 T samples may be averaged together or intelligently combined using any other desired algorithm. As one example, the 3 T sample may be thrown out and the 4 T sample may be used as the final image signal for both of the clear pixels 22 in the associated group 56. As another example, the 3 T and 4 T samples may be averaged from both clear pixels 22 in group 56 into an average image signal. In another example, the final image signal for the first clear pixel may be computed as a linear combination of the 3 T sample and the 4 T sample generated by the first clear pixel and the final image signal for the second clear pixel may be computed as a linear combination of the 3 T sample and the 4 T sample generated by the second clear pixel. This scenario may, for example, mitigate any increase in kTc-reset noise in dark regions of the image. In general, any desired combination of the 4 T and 3 T samples generated by the first and second clear pixels 22 in the corresponding group 56 may be used to compute the final image signal for each clear pixel 22 in the pixel group.

Image signals generated by the red and blue pixels 22 in group 56 may be transferred to floating diffusion 42 and read out using image readout circuitry 28 after the image signals for clear pixels 22 in group 56 have been read out. The charge accumulated by the red and blue pixels 22 may be transferred to floating diffusion 42 and readout using any desired charge transfer and readout scheme.

In scenarios where both clear pixels 22 in group 56 transfer overflow charge to floating diffusion 42 (e.g., both clear pixels transfer a first amount of charge to floating diffusion 42 during the first charge transfer operation), image readout circuitry 28 may be unable to resolve which image signal was generated by the first and second clear pixels 22, as a sum of charge generated on both image pixels 22 is stored on floating diffusion 42. However, the resolution lost in the clear pixel (e.g., luma) channel of the final image may be mitigated by the increase in dynamic range of the final image. In this scenario, image readout circuitry 28 may compute the final image signal for each of the two clear pixels 22 in group 56 as a sum of the 4 T sample and half of the 3 T sample (e.g., as both pixels transferred charge to the shared floating diffusion during the first charge readout operation, the 3 T portion of the final image signal for each clear pixel may be estimated as half of the total 3 T signal readout from floating diffusion node 42 between times T5 and T6 (FIG. 7)).

In scenarios where only one of the two clear pixels 22 in group 56 transfers overflow charge to floating diffusion 42 (e.g., scenarios in which only one clear pixel 22 has accumulated enough charge to overcome the potential barrier provided by the corresponding charge transfer gate 44 during the first charge transfer operation), image readout circuitry 28 may resolve each the two clear image pixels 22 in group 56 (e.g., so that corresponding final image signals may be accurately generated for each of the two clear pixels 22 in group 56). For example, readout circuitry 28 may determine which of the two clear pixels 22 transferred the overflow charge to shared floating diffusion region 42 based on the 4 T sample read out from each clear pixel 22 during the second charge transfer operation. In this scenario, readout circuitry 28 may read out the 3 T sample transferred to the shared floating diffusion node 42 by the first clear pixel 22 during the first charge transfer operation. During the second charge transfer operation, the amount of charge transferred from the first clear pixel 22 may fill the charge capacity of the shared floating diffusion node 42 (e.g., because the first clear pixel 22 in this scenario is more sensitive than the second clear pixel 22), whereas the second clear pixel 22 may transfer an insufficient amount of charge to fill the charge capacity of the shared floating diffusion node 42. Based on the second readout operation, readout circuitry 28 may determine that the first clear pixel 22 was the pixel that generated the overflow 3 T sample transferred during the first transfer operation (e.g., because the first clear pixel 22 was able to fill the charge capacity of floating diffusion region 42 during the second charge transfer operation while the second clear pixel 22 was unable to fill the charge capacity of region 42).

Readout circuitry 28 may thereby compute the final image signal for the first clear pixel 22 as a sum of the entire 3 T sample transferred to floating diffusion node 42 during the first transfer operation and the 4 T sample readout for the first clear pixel 22 (e.g., when the first and second clear pixels are readout at different times after second integration period ΔT2). Readout circuitry 28 may determine that the final image signal for the second clear pixel 22 is equal to the 4 T sample readout for the second clear pixel 22. In this way, readout circuitry 28 may accurately distinguish between each clear pixel 22 in group 56 when reconstructing the final image signal from the 3 T and 4 T image samples gathered by the clear pixels (e.g., allowing for improved clear channel spatial resolution relative to scenarios where both clear pixels transfer charge to the shared storage region 42 during the first charge transfer operation).

Figure 9:
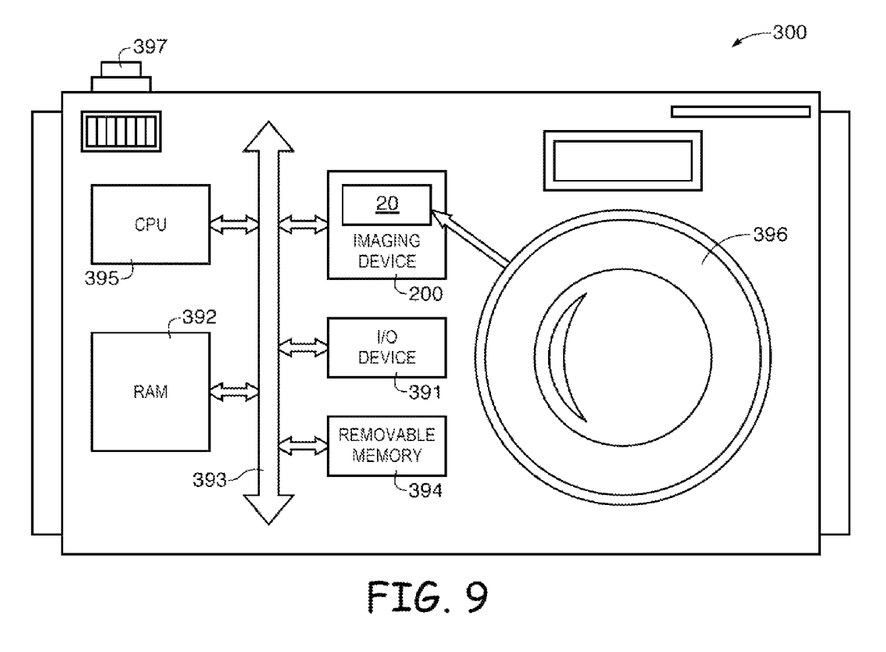
FIG. 9 is a block diagram of a processor system employing the embodiments of FIGS. 1-8 in accordance with an embodiment of the present invention.

FIG. 9 shows in simplified form a typical processor system 300, such as a digital camera, which includes an imaging device 200 (e.g., an imaging device 200 such as device 10 of FIGS. 1-8 and the techniques for performing multiple charge transfers to compensate for pixel arrays having pixels with different sensitivities). The processor system 300 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

The processor system 300 generally includes a lens 396 for focusing an image on pixel array 20 of device 200 when a shutter release button 397 is pressed, central processing unit (CPU) 395, such as a microprocessor which controls camera and one or more image flow functions, which communicates with one or more input/output (I/O) devices 391 over a bus 393. Imaging device 200 also communicates with the CPU 395 over bus 393. The system 300 also includes random access memory (RAM) 392 and can include removable memory 394, such as flash memory, which also communicates with CPU 395 over the bus 393. Imaging device 200 may be combined with the CPU, with or without memory storage on a single integrated circuit or on a different chip. Although bus 393 is illustrated as a single bus, it may be one or more busses or bridges or other communication paths used to interconnect the system components.

Various embodiments have been described illustrating image sensors having image pixels with different sensitivities and shared charge storage regions and control circuitry for extending the exposure range of higher sensitivity image pixels to improve the maximum signal to noise ratio of lower sensitivity image pixels in a pixel array.

An image sensor may have an array of image sensor pixels arranged in rows and columns and control and readout circuitry for reading out image signals from the array. The array of image sensor pixels may include a number of groups of image sensor pixels. Each group of image sensor pixels may include different photosensitive regions (e.g., photodiodes) that are each coupled to a shared charge storage region (e.g., a shared floating diffusion node) via respective charge transfer gates. Different color filter elements may be formed over each of the photodiodes so that the photodiodes have different sensitivities (e.g., so that the photodiodes have different spectral response levels). For example, broadband color filter elements may be formed over a first pair of photodiodes in the image pixel group, whereas red and blue color filter elements may be formed over a second pair of photodiodes in the image pixel group. In general, the broadband color filter elements may be any color filter element that transmits at least two of: red light, blue light and green light. In this way, the photodiodes provided with the broadband color filter elements may have a greater spectral response level than photodiodes provided with colored color filter elements (e.g., red, blue, or green color filter elements, etc.).

If desired, the control circuitry may perform a first charge transfer operation to simultaneously transfer an overflow charge accumulated by each of the photodiodes provided with broadband color filter elements in the pixel group to the shared charge storage region. The control circuitry may read out first image signals corresponding to the overflow charge from the shared charge storage region. The control circuitry may perform a second charge transfer operation to transfer a remaining charge accumulated by the photodiodes provided with broadband color filter elements regions to the shared charge storage region (e.g., after the first image signals have been read out), and may read out second image signals corresponding to the remaining charge from the shared charge storage region. If desired, the control circuitry may perform the first charge transfer operation by adjusting a charge transfer control signal simultaneously provided to the charge transfer gates coupled between the photodiodes provided with the broadband color filter elements and the shared charge storage region. For example, the control circuitry may provide assert the charge transfer control signal at a maximum voltage level or an intermediate voltage level that is greater than a minimum voltage level of the charge transfer control signal and less than the maximum voltage level. The control circuitry may perform the second charge transfer operation by asserting the charge transfer control signal at the maximum voltage level.

The control circuitry may transfer additional charge generated by the photodiodes covered with red and/or blue color filter elements to the shared charge storage region after the first and second image signals have been read out from the charge storage region. The control circuitry may generate a final image signal for a first of the photodiodes provided with the broadband color filter element and may generate a final image signal for a second of the photodiodes provided with the broadband color filter element based on the first and second image signals (e.g., as a linear combination of the first and second image signals generated by each of the photodiodes, etc.).

If desired, the control circuitry may determine which of the first and second photodiodes with the broadband color filter elements generated the overflow charge, may generate the final image signal for the first photodiode with the broadband color filter element by performing a sum of the first image signals and a portion of the second image signals (e.g., a portion generated by the first photodiode), and may generate the final image signal for the second photodiode with the broadband color filter element using an additional portion of the second image signals (e.g., a portion generated by the second photodiode) in response to determining that the first photodiode generated the overflow charge. If desired, the control circuitry may read out the first image signals corresponding to the overflow charge without sampling a reset level of the shared charge storage region and may sample the reset level of the shared charge storage region prior to reading out the second image signals corresponding to the remaining charge (e.g., to mitigate kTc-reset noise in the second image signals without mitigating kTc-reset noise in the first image signals).

If desired, the imaging system may further include a central processing unit, memory, input-output circuitry, and a lens that focuses light onto the array of image sensor pixels.

The foregoing is merely illustrative of the principles of this invention and various modifications can be made by those skilled in the art without departing from the scope and spirit of the invention. The foregoing embodiments may be implemented individually or in any combination.

What is claimed is:

1. A method of operating an image sensor having an array of image sensor pixels and pixel readout circuitry, wherein the array of image sensor pixels comprises a plurality of photosensitive regions having a shared charge storage region, the method comprising:
   with the array of image sensor pixels, performing a first charge transfer operation to transfer an overflow charge from the plurality of photosensitive regions to the shared charge storage region;
   with the pixel readout circuitry, reading out first image signals corresponding to the overflow charge from the shared charge storage region;
   with the array of image sensor pixels, performing a second charge transfer operation to transfer a remaining charge from the plurality of photosensitive regions to the shared charge storage region; and
   with the pixel readout circuitry, reading out second image signals corresponding to the remaining charge from the shared charge storage region.

2. The method defined in claim 1, wherein performing the second charge transfer operation comprises:
   performing the second charge transfer operation after reading out the first image signals from the shared charge storage region.

3. The method defined in claim 1, wherein the array of image sensor pixels comprises respective charge transfer gates coupled between each of the plurality of photosensitive regions and the shared charge storage region and wherein transferring the overflow charge comprises:
   adjusting a charge transfer signal provided simultaneously to each of the respective charge transfer gates.

4. The method defined in claim 3, wherein the charge transfer signal has a maximum voltage level and a minimum voltage level and wherein adjusting the charge transfer signal comprises:
   asserting the charge transfer signal at the maximum voltage level.

5. The method defined in claim 3, wherein the charge transfer signal has a maximum voltage level and a minimum voltage level and wherein adjusting the charge transfer signal comprises:
   asserting the charge transfer signal at an intermediate voltage level that is less than the maximum voltage level and that is greater than the minimum voltage level.

6. The method defined in claim 3, wherein transferring the overflow charge further comprises:
   adjusting the charge transfer signal provided to each of the respective charge transfer gates after a predetermined exposure time.

7. The method defined in claim 6, wherein the charge transfer signal has a maximum voltage level and a minimum voltage level and wherein transferring the remaining charge comprises:
   asserting the charge transfer signal provided to each of the respective charge transfer gates at the maximum voltage level after an additional predetermined exposure time subsequent to adjusting the charge transfer signal.

8. The method defined in claim 1, wherein the plurality of photosensitive regions comprise a first pair of photodiodes having first sensitivities and a second pair of photodiodes having second sensitivities, wherein the first sensitivities are greater than the second sensitivities, and wherein the overflow charge and the remaining charge are each transferred from the first pair of photodiodes to the shared charge storage region.

9. The method defined in claim 8, further comprising:
   with the pixel readout circuitry, transferring an additional charge from the second pair of photodiodes to the shared charge storage region after the first and second image signals have been read out from the charge storage region.

10. The method defined in claim 8, further comprising:
    with the pixel readout circuitry, generating a third image signal for a first photodiode in the first pair of photodiodes based on the first and second image signals; and
    with the pixel readout circuitry, generating a fourth image signal for a second photodiode in the first pair of photodiodes based on the first and second image signals.

11. The method defined in claim 10, wherein generating the third image signal comprises:
    generating the third image signal as a linear combination of the first and second image signals.

12. The method defined in claim 10, further comprising:
    with the pixel readout circuitry, determining which of the first and second photodiodes generated the overflow charge; and
    with the pixel readout circuitry, generating the third image signal by performing a sum of the first image signals and a portion of the second image signals and generating the fourth image signal using an additional portion of the second image signals in response to determining that the first photodiode generated the overflow charge.

13. The method defined in claim 1, wherein reading out the first image signals corresponding to the overflow charge comprises reading out the first image signals without sampling a reset level of the shared charge storage region and wherein reading out the second image signals comprises sampling the reset level of the shared charge storage region.

14. A method of operating an imaging system having control circuitry and a group of image pixels, wherein the group of image pixels comprises first and second photosensitive regions and a charge storage node, the method comprising:
- with the first and second photosensitive regions, accumulating respective first and second charges in response to image light;
- with the control circuitry, transferring the first accumulated charge to the charge storage node and reading out a first image signal corresponding to the first accumulated charge from the charge storage node;
- with the first photosensitive region, accumulating a third charge after the first accumulated charge has been transferred to the charge storage node;
- with the control circuitry, transferring the third accumulated charge to the charge storage node after the first image signal has been read out and reading out a second image signal corresponding to the third accumulated charge from the charge storage node; and
- with the control circuitry, after the second image signal has been read out from the charge storage node, transferring the second accumulated charge to the charge storage node and reading out a third image signal corresponding to the second accumulated charge from the charge storage node.

15. The method defined in claim 14, wherein the first photosensitive region is configured to accumulate the first charge in response to at least two of: red light, green light, and blue light, and wherein the second photosensitive region is configured to accumulate the second charge in response to one of: the red light, the green light, and the blue light.

16. The method defined in claim 14, further comprising:
- with the control circuitry, generating a final image signal for the first photosensitive region by performing a linear combination of the first and second image signals.

17. The method defined in claim 16, wherein the group of image pixels further comprises third and fourth photosensitive regions, wherein the first and third photosensitive regions have a first spectral response level, wherein the second photosensitive region has a second spectral response level that is less than the first spectral response level, and wherein the fourth photosensitive region has a third spectral response level that is less than the first spectral response level, the method comprising:
- with the third and fourth photosensitive regions, accumulating respective fourth and fifth charges in response to the image light;
- with the control circuitry, transferring the fourth accumulated charge to the charge storage node simultaneously with transferring the first accumulated charge from the first photosensitive region to the charge storage node;
- with the control circuitry, reading out a fourth image signal corresponding to the fourth accumulated charge from the charge storage node;
- with the third photosensitive region, accumulating a sixth charge after the fourth accumulated charge has been transferred to the charge storage node;
- with the control circuitry, transferring the sixth accumulated charge to the charge storage node and reading out a fifth image signal corresponding to the sixth accumulated charge from the charge storage node; and
- with the control circuitry, after the fifth image signal has been read out from the charge storage node, transferring the fifth accumulated charge to the charge storage node and reading out a sixth image signal corresponding to the fifth accumulated charge from the charge storage node.

18. A system, comprising:
- a central processing unit;
- memory;
- input-output circuitry; and
- an imaging device, wherein the imaging device comprises:
  - an array of image pixels having a plurality of photodiodes that are each coupled to a shared charge storage node through respective charge transfer gates;
  - a lens that focuses light onto the array; and
  - control circuitry, wherein the control circuitry is configured to:
    - transfer an overflow charge from a first photodiode of the plurality of photodiodes to the shared charge storage node by adjusting a charge transfer signal provided to a first charge transfer gate coupled between the first photodiode and the shared charge storage node;
    - read out a first image signal corresponding to the overflow charge from the shared charge storage node;
    - transfer a remaining charge from the first photodiode to the shared charge storage node after the first image signal has been read out by asserting the charge transfer signal provided to the first charge transfer gate;
    - read out a second image signal corresponding to the remaining charge from the shared charge storage node; and
    - generate a final image signal for the first photodiode by combining the first and second image signals.

19. The system defined in claim 18, wherein the control circuitry is further configured to:
- transfer an additional charge from a second photodiode in the plurality of photodiodes to the shared charge storage node by asserting an additional charge transfer signal provided to a second charge transfer gate coupled between the second photodiode and the shared charge storage node after the second image signal has been read out; and
- read out a third image signal corresponding to the additional charge from the shared charge storage node.

20. The system defined in claim 19, wherein the array of image pixels comprises a first color filter element formed over the first photodiode and a second color filter element formed over the second photodiode, wherein the first color filter element is configured to transmit at least two of: green light, blue light, and red light, and wherein the second color filter element is configured to transmit one of:
red light, green light, and blue light.

* * * * *